United States Patent Office 3,301,871
Patented Jan. 31, 1967

3,301,871
NOVEL 1,4-DIALKYLPROLINES, DERIVATIVES
THEREOF AND PROCESS
Barney J. Magerlein, Portage, Mich., assignor to The Upjohn Company, Kalamazoo, Mich., a corporation of Delaware
No Drawing. Filed June 15, 1964, Ser. No. 375,324
19 Claims. (Cl. 260—326.3)

This invention relates to novel compositions of matter and is particularly concerned with cis- and trans-1,4-dialkyl-L- and D-prolines and amides, esters and quaternary ammonium salts thereof, and the process of production therefor and intermediates thereof.

The products of this application and the process of production thereof are illustratively represented (for the cis-1,4-dialkyl-L-proline series) by the following sequence of formulae:

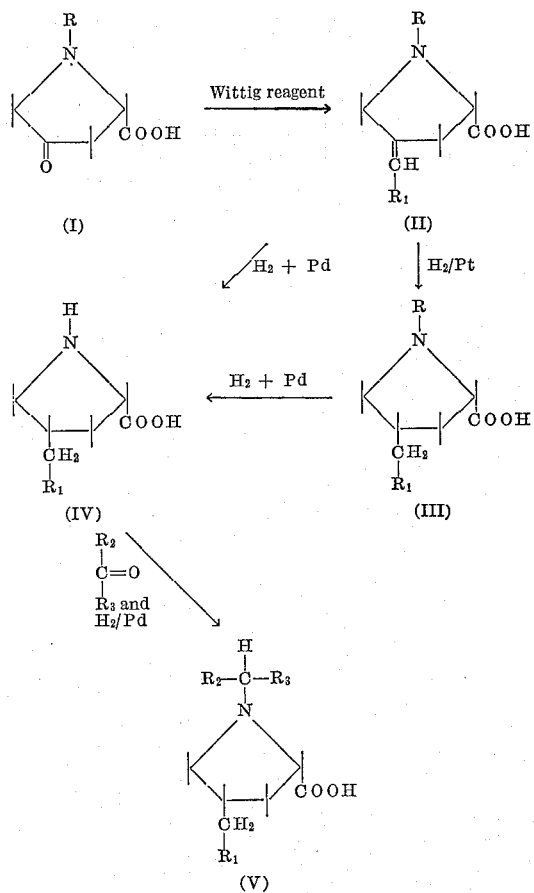

wherein R is a protective hydrocarbyloxycarbonyl group which is removable by hydrogenolysis and wherein $R_1$ is selected from the group consisting of hydrogen and alkyl, in which the alkyl group contains from 1 to 11 carbon atoms, inclusive, and wherein $R_2$ and $R_3$ are selected from the group consisting of hydrogen and alkyl in which the groups contain together up to and including 12 carbon atoms.

The protective hydrocarbyloxycarbonyl groups, R, which are removable by hydrogenolysis, include particularly benzyloxycarbonyl groups of the formula

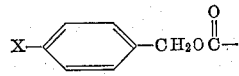

wherein X is selected from the group consisting of hydrogen, nitro, methoxy, chloro and bromo. Examples of such groups are carbobenzoxy, p-nitrocarbobenzoxy, p-bromo- and p-chlorocarbobenzoxy; also phenyloxycarbonyl groups of the formula

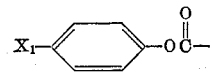

wherein $X_1$ is selected from the group consisting of hydrogen and alkyl containing from 1 to 4 carbon atoms, inclusive, such as phenyloxycarbonyl, p-tolyloxycarbonyl and p-ethylphenyloxycarbonyl; and allyloxycarbonyl and the like.

In addition, other substituents which are not hydrocarbyloxycarbonyl groups can be utilized as protective groups and removed by catalytic hydrogenolysis, e.g., triphenylmethyl, benzyl and p-nitrobenzyl.

The process of the present invention comprises: treating a 1-hydrocarbyloxycarbonyl-4-ketoproline (I) with a Wittig reagent, usually an alkylidenetriphenylphosphorane [see e.g., Wittig et al., Ber., 87, 1348 (1954); Trippett, Quarterly Reviews, XVII, No. 4, p. 406 (1963)] to obtain the corresponding 4-alkylidene-1-hydrocarbyloxycarbonylproline (II); hydrogenating the proline (II) in the presence of a platinum catalyst to obtain the corresponding 4-alkyl-1-hydrocarbyloxycarbonylproline (compound III representing the cis-L-proline isomer); hydrogenating compound III in the presence of a palladium catalyst to give the corresponding 4-alkylproline (IV); treating compound IV with a carbonyl compound $R_2COR_3$ defined as above, and hydrogenating in the presence of a palladium catalyst to obtain the corresponding 1,4-dialkylproline (V).

Alternatively, the 4-alkylidene-1-hydrocarbyloxycarbonylproline (II) can be hydrogenated in the presence of a palladium catalyst to give directly the 4-alkylproline of Formula IV.

Hydrogenation of II in the presence of a platinum catalyst gives significant amounts of both cis and trans isomers of structure III. Hydrogenation of II in the presence of palladium, however, gives final products which are mostly the cis isomer with mere traces of the trans isomer. In either method the final products can be obtained in pure form by conversion of the resulting 1,4-dialkylprolines (V) to their amides, separating the amides chromatographically and hydrolyzing the separated amides to obtain the pure prolines (see details in the examples).

Structure V represents a cis-1,4-dialkyl-L-proline. The other stereoisomers are as follows:

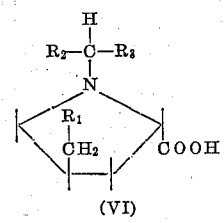

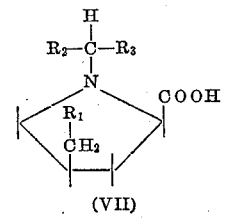

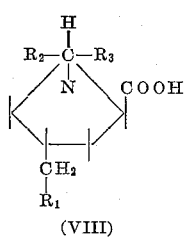

(VIII)

wherein $R_1$, $R_2$ and $R_3$ have the same significance as above.

Each of the α-amino acids of this invention can exist in three forms: as an anion, a cation, and a zwitterion. For example, at the isoelectric point the novel cis-1,4-dialkyl-L-proline (V) is in the zwitterion form Vz; in acid solution it is converted to the cationic form Vc; and in alkaline solution to the anionic form Va:

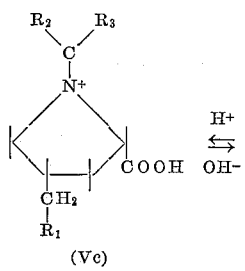

(Vc)

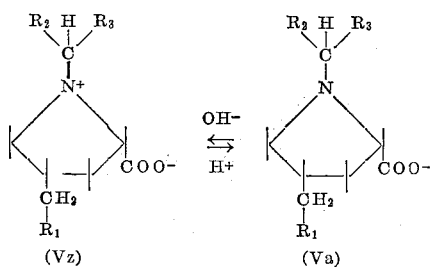

(Vz)    (Va)

wherein $R_1$, $R_2$ and $R_3$ have the same significance as above.

The invention furthermore comprises the preparation of the esters, alkali metal salts, quaternary ammonium salts and amides of the novel compound cis-4-propyl-L-hygric acid (V, $R_1=C_2H_5$; $R_2=R_3=H$), the use of this new cis-4-propyl-L-hygric acid to prepare a new antibiotic, allolincomycin, the preparation of various other cis- and trans-4-alkyl-L-hygric acids, intermediates thereto and the like. The novel compounds of this invention of Formulas V, VI, VII, and VIII are useful compounds for the preparation of new synthetic antibiotics as shown for example by the preparation of the highly active new antibiotic allolincomycin from cis-4-propyl-L-hygric acid and methyl thiolincosaminide. The esters and amides of the acids V, VI, VII and VIII are important as intermediates in the production of quaternary ammonium salts which are active as antimicrobial agents and in addition can be used in electrocardiographic jellies in view of their electroconductivity and wetting power. For example, alkyl halide quaternary ammonium salts of cis-1,4-dialgyl-L-proline esters and amides having the Formula IX:

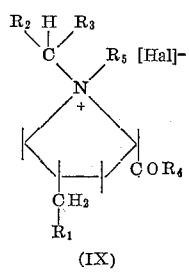

(IX)

wherein $R_1$, $R_2$ and $R_3$ are defined as hereinbefore; wherein $R_4$ is selected from the group consisting of alkoxy radicals, in which the alkyl group has from 1 to 8 carbon atoms, and amino; wherein $R_5$ is an alkyl group containing from 1 to 20 carbon atoms, inclusive; and wherein Hal is selected from the group consisting of iodine and bromine, are obtained by treating the selected amide or ester (prepared as shown in the examples) with an alkyl halide, such as methyl iodide, ethyl iodide, butyl iodide, hexyl iodide, octyl iodide, decyl iodide, dodecyl iodide, tetradecyl iodide, hexadecyl iodide, octadecyl iodide, eicosyl iodide, methyl bromide, ethyl bromide, butyl bromide, hexyl bromide, heptyl bromide, dodecyl bromide, octadecyl bromide, eicosyl bromide, and the like, to give the corresponding methiodide, ethiodide, butyl iodide, hexyl iodide, octyl iodide, decyl iodide, dodecyl iodide, tetradecyl iodide, hexadecyl iodide, octadecyl iodide, eicosyl iodide, methobromide, ethobromide, butyl bromide, hexyl bromide, heptyl bromide, dodecyl bromide, octadecyl bromide, eicosyl bromide, and the like of 1,4-dialkylproline amides and 1,4-dialkylproline esters.

A suitable composition of an electrocardiographic jelly containing the above-indicated salts can be prepared as follows:

| | Parts |
|---|---|
| Glycerol | 5 |
| Starch | 10 |
| Quaternary ammonium salt | 60 |
| Water | 100 |

The jelly is prepared by mixing the starch, glycerol and water, and then adding the selected alkyl halide quaternary salt of the amide or ester of a 1,4-dialkylproline.

The above-listed quaternary ammonium salts, having pronounced antibacterial activity, are furthermore useful for cleaning instruments used in bacteriology or medicine, and floors, walls or ceilings in laboratories where bacteriological specimens are kept.

The novel 1,4-dialkylprolines per se are also useful as buffers and antacids.

The novel 1,4-dialkylprolines form stable protonates (acid addition salts) on treatment with suitable acids, for example, hydrochloric, hydrobromic, hydriodic, sulfuric, phosphoric, nitric, chloric, perchloric, thiocyanic, fluosilicic, salicylic, glycolic, tartaric, maleic, malic, phenylacetic, lactic, methanesulfonic, cyclohexanesulfonic, and the like.

The invention also embodies the formation of various metal salts, for example those obtained when 1,4-dialkylprolines are treated with an alkali metal hydroxide or an alkaline earth metal hydroxide. For example, when cis-4-propyl-L-hygric acid is treated with one equivalent of a metal hydroxide, such as sodium hydroxide, potassium hydroxide, calcium hydroxide or the like, the corresponding sodium, potassium, calcium or the like salt of cis-4-propyl-L-hygric acid is obtained.

Amine salts of 1,4-dialkylprolines are obtained in a like manner by substituting a nitrogenous base, such as an alkyl amine, for the inorganic base. Advantageously, the neutralization is effected in an organic solvent such as methanol, ethanol, propanol, butanol, amyl acetate, and the like. Quaternary ammonium hydroxides can be used to prepare the corresponding tetraalkyl ammonium salt of 1,4-dialkylprolines; thus, tetramethylammonium hydroxide yields the tetramethylammonium salt of 1,4-dialkylprolines.

The acid addition salts and metal and amine salts disclosed above are useful in upgrading the 1,4-dialkylprolines.

The novel 1,4-dialkylprolines can be easily transformed to a quaternary ammonium salt by reaction with an alkyl halide, for example, an alkyl chloride, bromide or iodide. Other quaternary ammonium salts can be prepared by treating, for example, the methiodide or ethiodide of a 1,4-dialkylproline with silver oxide or silver carbonate to obtain the corresponding quaternary ammonium hydroxide and treating the latter with the acid of choice, such as nitric acid, phosphoric acid, p-toluenesulfonic acid, and the like.

The fluosilicic acid salts of 1,4-dialkylprolines are particularly useful for mothproofing according to U.S. Patents 1,915,334 and 2,075,359.

The new 1,4-dialkylprolines can furthermore be converted to 1,4-dialkyl-2-pyrrolidinylpenicillins by condensing the prolines with 6-aminopenicillanic acid as shown in Example 9a. These new penicillins have greater stability, particularly against acids and against penicillinase and are thus more effective than penicillin.

In carrying out the process of the present invention a 1-hydrocarbyloxycarbonyl-4-ketoproline, for example, 4-keto-1-hydrocarbyloxycarbonyl-L-proline (I), as defined earlier, is usually added to a freshly prepared Wittig reagent. The Wittig reagents herein used can be generally represented by the following formula:

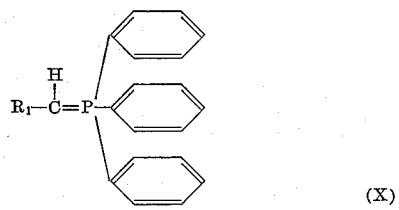

wherein $R_1$ is selected from the group consisting of hydrogen and alkyl in which the alkyl group contains from 1 to 11 carbon atoms, inclusive. These Wittig reagents are prepared by reacting an alkyltriphenylphosphonium halide with a base such as sodamide, or sodium or potassium hydride, or the sodium or potassium metalate of dimethylsulfoxide and the like. The base, by eliminating hydrogen halide from the alkyltriphenylphosphonium halide, produces the alkylidenetriphenylphosphorane of the structure (X). [The preparation of phosphoranes is discussed in detail by Trippett, Quart. Rev. XVII, No. 4, p. 406 (1963).] The reaction is generally carried out in an organic solvent, such as benzene, toluene, ether, dimethylsulfoxide, tetrahydrofuran, or the like, at temperatures between 10° and the reflux temperature of the reaction mixture. The thus-obtained product, a 4-alkylidene-1-hydrocarbyloxycarbonyl-L-proline, is recovered from the reaction mixture in a conventional manner, generally by extraction from aqueous solutions of the reaction mixture. The crude product can be purified by conventional means, such as recrystallization, chromatography, or formation and recrystallization of easily formed derivatives such as amine salts of the amino acid, e.g., the dicyclohexylamine salt, and the like, and liberating the amino acids from such compounds.

The thus-obtained 4-alkylidene-1-hydrocarbyloxycarbonylproline is then hydrogenated in the presence of a noble metal catalyst, such as palladium or platinum, which is generally deposited on a carrier. If a palladium-on-carbon catalyst is used, the final product is almost exclusively a cis-4-alkylproline (III). If platinum, particularly platinum deposited on an anion exchange resin like Dowex-1, is used, a mixture of the cis- and trans-epimers of the 1-hydrocarbyloxycarbonyl-4-alkylproline is obtained. This latter product is again hydrogenated in the presence of a palladium catalyst to obtain a mixture of cis- and trans-4-alkylprolines.

Usually the reaction mixture is not further purified but it is immediately reacted with an aldehyde or ketone of formula

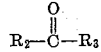

as defined, and hydrogen and additional palladium-on-carbon catalyst to produce the corresponding 1,4-dialkylproline. The 1,4-dialkylproline is isolated by filtering the reaction mixture resulting from the hydrogenation and distilling the solvent. For purification, the material can be crystallized as the free amino acid, or it can be crystallized as a hydrochloride or hydrobromide of the amino acid, or as shown in one of the examples it can be converted to the amide mixture, the amides can be separated by chromatography, and hydrolyzed by treatment with a mineral acid to the corresponding cis- or trans-4-alkyl-L-hygric acid as a mineral acid salt, from which the free acid is obtained by treating the salt with a base, such as silver oxide or silver carbonate, as shown further in the examples.

The following examples are illustrative of the process and products of the present invention, but are not to be construed as limiting.

*Example 1.—4-methylene-1-carbobenzoxy-L-proline*

Sodamide was prepared in the usual manner from 1.29 g. (56 mmole) of sodium in 170 ml. of liquid ammonia. Twenty grams (56 mmole) of methyltriphenylphosphonium bromide was added, the mixture was stirred at room temperature (24–26° C.) for one hour, and the ammonia was evaporated.

To the residue was added 150 ml. of a mixture of equal amounts of ether and tetrahydrofuran. The mixture was heated at reflux for a period of 5–7 minutes, cooled to 26° C. and thereto was added 2.63 g. (10 mmole) of 4-keto-1-carbobenzoxy-L-proline [Patchett et al., J. Am. Chem. Soc., 79, 185 (1957)] in 20 ml. of tetrahydrofuran. After heating the reaction mixture under reflux for 2.5 hours, the mixture was cooled, diluted with ether and aqueous sodium bicarbonate solution and filtered; the ether was discarded. The filtrate was acidified, extracted with ether and the extracts were evaporated to give 2.2 g. of crude 4-methylene-1-carbobenzoxy-L-proline.

The crude material (2.2 g.) was dissolved in ether and 1.8 ml. of dicyclohexylamine was added; 3.25 g. (74.4% yield) of 4-methylene-1-carbobenzoxy-L-proline dicyclohexylamine salt crystallized rapidly. The crystals after drying melted at 154–158° C.; rotation $[\alpha]_D$ +0.56° (c. .795, chloroform).

*Example 2.—Cis-4-methyl-L-proline*

A suspension of 20.9 g. of 4-methylene-1-carbobenzoxy-L-proline dicyclohexylamine salt in 308 ml. of 5% aqueous sodium hydroxide and 308 ml. of ether was shaken until all of the solid had dissolved. The layers were separated and each was backwashed with fresh solvent. The aqueous solutions were combined, acidified with dilute acid and extracted with ether. Evaporation of the solvent gave 4-methylene-1-carbobenzoxy-L-proline; yield, 12.1 g. (97.5%). This acid was dissolved in 250 ml. of methanol and hydrogenated over 2 g. of 10% palladium-on-carbon catalyst under 40 lbs. pressure of hydrogen for 2.5 hours. Filtration and evaporation of the reaction mixture gave cis-4-methyl-L-proline which was crystallized from methanol-ether; it melted at 231–233° C.

Further recrystallization from acetonitrile gave pure cis-4-methyl-L-proline melting at 238–240° C.

*Analysis.*—Calcd. for $C_6H_{11}NO_2$: C, 55.79; H, 8.59; N, 10.85. Found: C, 55.39; H, 8.42; N, 10.78.

*Example 3.—Cis-4-methyl-L-hygric acid and the dicyclohexylamine salt of cis-4-methyl-L-hygric acid*

Six milliliters of formalin and 1 g. of palladium-on-carbon catalyst (10% palladium) were added to the hydrogenated reaction mixture obtained in Example 2 and hydrogenation was continued for 2 hours. Thereafter the mixture was filtered to remove the catalyst and the solvent was removed by distillation. The resulting oily residue of 7.4 g., chiefly cis-4-methyl-L-hygric acid, did not crystallize. It was dissolved in methanol and ether saturated with hydrogen chloride. Crystalline cis-4-methyl-L-hygric acid hydrochloride precipitated, which was recovered by filtration and dried. The dried material had a melting point of 206 to 215° C. and after several recrystallizations from methanol and ether cis-4- methyl-L-hygric acid ·HCl of melting point 213–216° C. was obtained.

*Analysis.*—Calcd. for C₇H₁₄ClNO₂: C, 46.80; H, 7.85; N, 7.80. Found: C, 47.54; H, 7.81; N, 8.00.

*Example 4.—4-carbethoxymethylene-1-carbobenzoxy-L-proline*

A solution of 1.5 g. of 4-keto-1-carbobenzoxy-L-proline and 4.2 g. of carbethoxymethylenetriphenylphosphorane in 100 ml. of benzene was heated under reflux for 4 hours. The reaction mixture was cooled, extracted twice with aqueous sodium bicarbonate solution, and the extracts were combined and acidified with 4 N hydrochloric acid. The acidified mixture was extracted 3 times with ether and the extracts were combined, washed with water, aqueous sodium bisulfite, water, dried over anhydrous sodium sulfate, and evaporated to give 0.65 g. of 4-carbethoxymethylene-1-carbobenzoxy-L-proline as an oil.

The oil was dissolved in ether and thereto was added 0.35 cc. of dicyclohexylamine. A small amount of hexanes was added, the sides of the container were scratched, the mixture was refrigerated for 4 hours between 0 and 5° C., and the thus-formed crystals were recovered by filtration. The crystals, 0.87 g., were twice recrystallized from acetonitrile to give the pure dicyclohexylamine salt of 4-carbethoxymethylene-1-carbobenzoxy-L-proline of melting point 158–160° C.

*Analysis.*—Calcd. for C₂₉H₄₂N₂O₆: C, 67.68; H, 8.24; N, 5.44. Found: C, 68.00; H, 8.29; N, 5.45.

*Example 5.—4-propylidene-1-carbobenzoxy-L-proline and dicyclohexylamine salt*

Sodium hydride (3.8 g.) was warmed with 75 ml. of dimethylsulfoxide at a temperature of 70–75° C. until the reaction was complete. After cooling to 20° C., 30.8 g. of propyltriphenyl-phosphonium bromide was added, and the resulting red solution was stirred for 30 minutes to insure complete reaction. A solution of 5.2 g. of 4-keto-1-carbobenzoxy-L-proline in 15 ml. of dimethyl sulfoxide was added over a period of 15 minutes, and the resulting mixture was stirred for 20 minutes at 26° C. and then at 70° C. for 4 hours. The reaction mixture was cooled, 100 ml. of 5% aqueous potassium bicarbonate and 100 ml. of water added, and filtered. The filtrate was washed twice with 150 ml. portions of ether and the ether was discarded after back extracting with bicarbonate. The bicarbonate solutions were combined, diluted with 200 ml. of water, and acidified with 4 N hydrochloric acid. The acidified mixture was extracted with three 200-ml. portions of ether. The combined ether extracts were washed with three 50-ml. portions of saturated aqueous sodium bisulfite, then with water and dried over anhydrous sodium sulfate. Evaporation of the solvent gave 5.7 g. of a solid residue which was 4-propylidene-1-carbobenzoxy-L-proline.

This residue was dissolved in 18 ml. of acetonitrile and treated with 2.8 ml. of dicyclohexylamine. The crystalline dicyclohexylamine salt, 5.2 g. (55% yield), melted at 154–157° C. After three recrystallizations from acetonitrile, an analytical sample was obtained which melted at 164–166° C. and had a rotation of [α]_D −8° (c.=0.3898 g./100 ml., CHCl₃).

*Analysis.*—Calcd. for C₂₈H₄₂N₂O₄: C, 71.45; H, 9.00; N, 5.95. Found: C, 71.77; H, 9.39; N, 5.1.

*Example 6.—Cis-4-propyl-L-proline*

Eight grams (17 mmoles) of the dicyclohexylamine salt of 4-propylidene-1-carbobenzoxy-L-proline was shaken with excess 1.5 N sodium hydroxide solution and ether until solution was complete. The layers were separated and each one was backwashed. The aqueous alkaline layer was combined with the backwash from the ether layer and acidified with 4 N hydrochloric acid. The mixture was extracted with ether and the ether extracts were combined and evaporated to give 4.8 g. (97.8%) of 4-propylidene-1-carbobenzoxy-L-proline as an oil. This oil was hydrogenated in 200 ml. of methanol over 1 g. of 10% palladium-on-charcoal catalyst for a period of 2 hours. Since the reaction appeared incomplete from thin-layer chromatographic analysis, hydrogenation was continued for 2 hours after 0.5 g. of fresh catalyst had been added. The mixture was thereupon filtered and the filtrate was evaporated to a residue which was crystallized from methanol-ether: melting point about 222° C. with decomposition. This product consisted of cis-4-propyl-L-proline with a trace of trans-4-propyl-L-proline.

*Example 7.—Cis-4-propyl-L-hygric acid*

To the hydrogenation mixture from a hydrogenation conducted as in Example 6 was added 5 ml. of formalin. The mixture was hydrogenated for 2.5 hours at 45 lbs. pressure of hydrogen in the presence of an additional ½ g. of 10% palladium-on-carbon catalyst. The mixture was cooled, filtered and the filtrate was evaporated to dryness. The residue was dissolved in methanol, converted to the hydrochloride by treatment of the methanol solution with an ether-hydrogen chloride solution and crystallized from methanol-ether to give 2.82 g. (80%) of cis-4-propyl-L-hygric acid hydrochloride of melting point 201–206° C.; rotation [α]_D −60° (c.=0.8344, H₂O).

*Analysis.*—Calcd. for C₉H₁₇NO₂·HCl: C, 52.04; H, 8.73; N, 6.75. Found: C, 51.72; H, 8.96; N, 6.44.

This sample contained less than 2% of trans-4-propyl-L-hygric acid.

Treating cis-4-propyl-L-hygric acid hydrochloride in aqueous solution with silver oxide, removing the thus-formed silver chloride and excess silver oxide by filtration, and evaporating the filtrate gave cis-4-propyl-L-hygric acid in the zwitterion form.

*Example 7a.—1-ethyl-cis-4-propyl-L-proline*

In the manner given in Example 7, 5 ml. of acetaldehyde was added to a hydrogenation mixture from a hydrogenation as conducted in Example 6, and hydrogenation was continued in the presence of a palladium-on-charcoal catalyst to give 1-ethyl-cis-4-propyl-L-proline.

*Example 7b.—1-propyl-cis-4-propyl-L-proline*

In the manner given in Example 7, 5 ml. of propionaldehyde was added to a hydrogenation mixture from a hydrogenation as conducted in Example 6, and hydrogenation was continued in the presence of a palladium-on-charcoal catalyst to give 1-propyl-cis-4-propyl-L-proline.

*Example 7c.—1-butyl-cis-4-propyl-L-proline*

In the manner given in Example 7, 5 ml. of butyraldehyde was added to a hydrogenation mixture from a hydrogenation as conducted in Example 6, and hydrogenation was continued in the presence of a palladium-on-charcoal catalyst to give 1-butyl-cis-4-propyl-L-proline.

*Example 7d.—1-sec-butyl-cis-4-propyl-L-proline*

In the manner given in Example 7, 5 ml. of methyl ethyl ketone was added to a hydrogenation mixture from a hydrogenation as conducted in Example 6, and hydrogenation was continued in the presence of a palladium-on-charcoal catalyst to give 1-sec-butyl-cis-4-propyl-L-proline.

*Example 7e.—1-(1-butylpentyl)-cis-4-propyl-L-proline*

In the manner given in Example 7, 5 ml. of dibutyl ketone was added to a hydrogenation mixture from a hydrogenation as conducted in Example 6, and hydrogenation was continued in the presence of a palladium-on-charcoal catalyst to give 1-(1-butylpentyl)-cis-4-propyl-L-proline.

*Example 7f.—1-dodecyl-cis-4-propyl-L-proline*

In the manner given in Example 7, 5 ml. of lauraldehyde was added to a hydrogenation mixture from a hydrogenation as conducted in Example 6, and hydrogenation was continued in the presence of a palladium-on-charcoal catalyst to give 1-dodecyl-cis-4-propyl-L-proline.

*Example 7g.—1-(1-pentylhexyl)-cis-4-propyl-L-proline*

In the manner given in Example 7, 5 ml. of dipentyl ketone was added to a hydrogenation mixture from a hydrogenation as conducted in Example 6, and hydrogenation was continued in the presence of a palladium-on-charcoal catalyst to give 1-(1pentylhexyl)-cis-4-propyl-L-proline.

*Example 7h.—1-(1-pentylheptyl)-cis-4-propyl-L-proline*

In the manner given in Example 7, 5 ml. of pentyl hexyl ketone was added to a hydrogenation mixture from a hydrogenation as conducted in Example 6, and hydrogenation was continued in the presence of a palladium-on-charcoal catalyst to give 1-(1-pentylheptyl)-cis-4-propyl-L-proline.

*Example 8.—Allolincomycin hydrochloride*

(A) METHYL THIOLINCOSAMINIDE

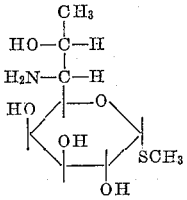

A solution of 4 g. of lincomycin [U.S. Patent 3,086,912] in 20 ml. of hydrazine hydrate (98–100%) was refluxed for 21 hours; excess hydrazine hydrate was then removed in vacuo under nitrogen at steam bath temperature, leaving a residue. The residue, a pasty mass of crystals, was cooled, acetonitrile was added, and the mixture was stirred until the crystals were suspended. The crystals were collected on a filter, washed with acetonitrile and with ether. The yield of white, crystalline methyl thiolincosaminide after drying in vacuo at room temperature was 2.1 g. (84%). Recrystallization was accomplished by dissolving methyl thiolincosaminide in hot dimethylformamide and adding an equal volume of ethylene glycol dimethyl ether.

Methyl thiolincosaminide has a melting point of 225–228° C., an optical rotation of $[\alpha]_D^{25}$ +276° (c.=.768, water) and a pKa' of 7.45.

*Analysis.*—Calcd. for $C_9H_{19}NO_5S$: C, 42.7; H, 7.56; N, 5.53; S, 12.66. Found: C, 42.6; H, 7.49; N, 5.75; S, 12.38.

(B) ALLOLINCOMYCIN HYDROCHLORIDE

A mixture of 2.47 g. (12 mmoles) of cis-4-propyl-L-hygric acid hydrochloride and 7.6 ml. (16 mmoles) of tributylamine in 80 ml. of distilled acetonitrile was stirred until all of the solid had dissolved. The solution was cooled in an ice bath and 1.54 g. (12 mmoles) of isobutyl chloroformate was slowly added. After one hour a solution of 3 g. of methyl thiolincosaminide (12 mmoles) in 60 ml. of water was added. The reaction mixture was stirred for one hour in the ice bath and then 3 hours at 26° C. The acetonitrile was removed in vacuo and the residue thus obtained was diluted with 20 ml. of water and twice extracted with ether. The aqueous solution was lyophilized. The residue was dissolved in methanol, chloroform was added, and the solution was washed twice with water. Evaporation of the organic layer and analysis of the residue by thin-layer chromatography showed no lincomycin, but after chromatography over Florisil the presence of the N-isobutyloxycarbonyl derivative of methyl thiolincosaminide could be demonstrated.

The aqueous washings from above were lyophilized and dried at 50° C. under vacuum. The residue was leached several times with chloroform and the chloroform solution was chromatographed over 200 g. of Florisil, a synthetic magnesium silicate, collecting fractions of 375 ml. and using a gradient elution system composed of 4 l. of Skellysolve B hexanes with 20% ethyl acetate in Reservoir A and a solution of 20% methanol diluted to 4 l. with Skellysolve B hexanes-20% ethyl acetate in Reservoir B. The fractions which showed material in the lincomycin area by thin-layer chromatography, fractions 11–16, were combined and evaporated to give .86 g. of an oil. This oil was dissolved in dilute hydrochloric acid and the crude hydrochloride, allolincomycin hydrochloride, having the following formula:

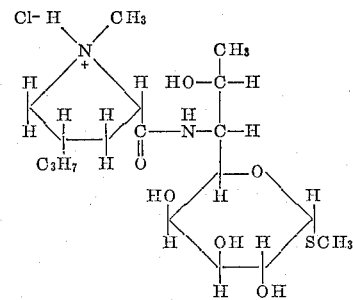

was precipitated with acetone. A small trace of lincomycin itself was also formed. The total yield was 480 mg. (9.04%). Several recrystallizations of the crude allolincomycin hydrochloride afforded an analytical sample, melting point 147–150° C., which was found to have a high antibacterial activity. Rotation $[\alpha]_D^{25}$ +110° (c. 0.493, water).

*Analysis.*—Calcd. for $C_{12}H_{34}N_2O_6S \cdot HCl$: C, 48.80; H, 7.96; N, 6.32. Found: C, 49.15; H, 7.80; N, 6.39.

Two grams of allolincomycin hydrochloride dissolved in 100 ml. of water was treated with 2 grams of silver carbonate. The mixture was then extracted three times with butanol. The combined extracts were distilled in vacuo to give a residue, which was dissolved in ethanol. The solution was treated with 1 g. of activated charcoal, and filtered. The filtrate was evaporated to dryness and the residue was crystallized and twice recrystallized from ethanol to give allolincomycin.

Mineral acid salts and organic acid salts, particularly those of hydrocarbon carboxylic acids, of allolincomycin are prepared by reacting the stoichiometrically calculated amount of a selected acid with allolincomycin. In this manner allolincomycin salts with hydriodic, nitric, sulfuric, hydrobromic, chloric, perchloric, phosphoric, formic, trichloroacetic, acetic, propionic, citric, tartaric and other acids can be prepared.

*Example 9.—Cis-4-propyl-L-hygramide and trans-4-propyl-L-hygramide*

A mixture of 3.09 g. (15 mmoles) of cis-4-propyl-L-hygric acid containing a small quantity of trans-4-propyl-L-hygric acid, 9.5 ml. of tributylamine, 100 ml. of acetonitrile and 40 ml. of acetone was stirred until complete solution had taken place. To this solution, cooled to 10° C., was added 2.05 ml. of isobutyl chloroformate. The reaction mixture was stirred for 30 minutes in the ice bath after which time 15 ml. of ammonium hydroxide was added and stirring was continued for 2 hours at room temperature. The mixture was distilled in vacuo until a residue was obtained, which was acidified with hydrochloric acid and extracted with ether. The ether extracts were discarded. The acidified aqueous fraction was made alkaline with sodium hydroxide and extracted with methylene chloride. The methylene chloride extract was chromatographed over silica gel (500 g.) using aqueous 80% acetone as the eluant and taking 15 ml. fractions. The fractions consisting of almost pure cis-4-propyl-L-hygramide as shown by thin-layer chromatography and fractions of a mixture of cis-4-propyl-L-hygramide together with trans-4-propyl-L-hygramide were obtained. The latter fractions were rechromatographed to yield a small amount of fairly pure trans-4-propyl-L-hygramide and a larger amount of mixtures of trans-4-propyl-L-hygramide and cis-4-propyl-L-hygramide. The mixtures were again rechromatographed and the fractions containing almost pure trans-4-propyl-L-hygramide were combined with the prior fraction containing the almost pure trans isomer. These fractions were thereupon recrystallized from Skellysolve B to give 10 mg. of trans-4-propyl-L-hygramide, about 85% pure on the basis of thin-layer chromatography; rotation $[\alpha]_D^{25}$ —91° (c. 0.833, $H_2O$).

The fractions containing the almost pure cis-4-propyl-L-hygramide were recrystallized from ethyl acetate-Skellysolve B to give pure cis-4-propyl-L-hygramide of melting point 113.5–115.5° C. and rotation $[\alpha]_D$ —89° (c. 0.841, $H_2O$).

Analysis.—Calcd. for $C_9H_{18}NO_2$: C, 63.49; H, 10.66; N, 16.46. Found: C, 63.41; H, 10.76; N, 16.28.

*Example 9a.—Potassium 6-(4-cis-propyl-L-hygramido) penicillanate*

A mixture of 3.09 g. of cis-4-propyl-L-hygric acid, 9.5 ml. of tributylamine, 100 ml. of acetonitrile and 40 ml. of acetone was stirred until complete solution had taken place. To this solution, cooled to 0° C., was added 2.05 ml. of isobutyl chloroformate. The reaction mixture was stirred for 30 minutes in an ice bath, then 3.24 g. of 6-aminopenicillanic acid in 50 ml. of water and 1.7 g. sodium bicarbonate was added, and stirring was continued at room temperature for 2 hours. The mixture was evaporated to dryness.

The residue was partitioned between ether and water, and the ether layer was discarded. The aqueous layer was acidified, extracted several times with ether and the ether solution was dried over sodium sulfate. The addition of a 40% solution of potassium 2-ethyl hexanoate in butyl alcohol precipitated potassium 1-methyl-4-cis-propyl-2-pyrrolidinyl penicillin [potassium 6-(4-cis-propyl-L-hygramido)penicillante].

*Example 10.—Cis-4-propyl-L-hygric acid hydrochloride from cis-4-propyl-L-hygramide*

Cis-4-propyl-L-hygramide (400 mg.) was heated with 22 ml. of 20% hydrochloric acid under reflux for a period of 4 hours. The reaction mixture was then cooled, evaporated to dryness in vacuo, and the residue was slurried with a small amount of warm ethanol and filtered to remove ammonium chloride. Ether was added to the filtrate and after cooling a white solid separated. After four recrystallizations from ethanol, cis-4-propyl-L-hygric acid hydrochloride was obtained which, as in Example 7, could be converted to cis-4-propyl-L-hygric acid by treatment with silver oxide.

*Example 11.—Trans-4-propyl-L-hygric acid hydrochloride*

In the manner given in Example 10, trans-4-propyl-L-hygramide was hydrolyzed with hydrochloric acid to give trans-4-propyl-L-hygric acid hydrochloride.

*Example 12.—Methyl cis-4-propyl-L-hygrate*

Twenty grams of cis-4-propyl-L-hygric acid was added to 200 ml. of anhydrous methanol and into this reaction mixture was bubbled dry hydrogen chloride for one hour. The flask was loosely stoppered and allowed to stand at room temperature overnight. The solvent was removed under reduced pressure and the residual material was dissolved in 200 ml. of methanol, which was then removed under reduced pressure. The resulting oily material was dissolved in 150 ml. of water, treated with activated charcoal (Darco G–60) and filtered. To the filtrate was carefully added about 50 g. of solid potassium carbonate, whereupon a colorless oil separated. The mixture was extracted twice with 100 ml. portions of ether, additional potassium carbonate was added to the aqueous phase, and the aqueous phase was again extracted with 100 ml. of ether. The ether extracts were combined, dried over anhydrous sodium sulfate and evaporated under reduced pressure. The residue was recrystallized three times from ethanol to give, as a near-white solid, methyl cis-4-propyl-L-hygrate.

*Example 13.—Methiodide of methyl cis-4-propyl-L-hygrate*

To three grams of methyl cis-4-propyl-L-hygrate was added with cooling and continuous stirring 4.25 g. of methyl iodide; a vigorous reaction ensued. After additional cooling, 2.5 g. of methyl iodide was added and the mixture was allowed to stand overnight at room temperature. Excess methyl iodide was removed under reduced pressure, and the solid obtained was dissolved in 50 ml. of anhydrous ethanol. The ethanol was removed under reduced pressure and the residue was recrystallized three times from a 1:1 mixture of ethanol: ether to yield crystals of the methiodide of methyl cis-4-propyl-L-hygrate.

*Example 14.—Ethyl cis-4-propyl-L-hygrate hydrochloride*

Into a solution of 2 g. of cis-4-propyl-L-hygric acid in 25 ml. of anhydrous ethanol was bubbled a stream of dry hydrogen chloride gas for a period of 50 minutes at room temperature. The mixture was allowed to stand overnight and the solvent was removed under reduced pressure. The residual oil was dissolved in ethanol, which was removed under reduced pressure. The oil was then dissolved in 50 ml. of water, treated with activated carbon and filtered. The filtrate was evaporated in vacuo and the residue was recrystallized four times from ethanol:water to give ethyl cis-4-propyl-L-hygrate hydrochloride.

*Example 15.—Methiodide of ethyl cis-4-propyl-L-hygrate*

To 2 g. of ethyl cis-4-propyl-L-hygrate was added 2.5 g. of methyl iodide. After standing at room temperature for a period of 22 hours, the reaction mixture was dissolved in 20 ml. of methanol, treated with decolorizing carbon and filtered. The filtrate was evaporated to dryness under reduced pressure and the residue was recrystallized twice from ethyl acetate to give crystals of the methiodide of ethyl cis-4-propyl-L-hygrate.

*Example 16.—Methiodide of cis-4-propyl-L-hygramide*

A solution of 2.5 g. of cis-4-propyl-L-hygramide in 20 ml. of methanol was treated with 3 ml. of methyl iodide with cooling. After the initial vigorous reaction had abated, 20 ml. of methanol and 5 ml. of methyl iodide were added. After stirring until the exothermic reaction was over, the methiodide of cis-4-propyl-L-hygramide was filtered and washed with methanol. The light yellow filtrate was evaporated to dryness in vacuo and the residue was dissolved in 50 ml. of acetone and seeded with a small amount of crystal preformed in acetone and ethyl acetate. The mixture was then cooled in a refrigerator overnight and the crystals thus obtained were collected by filtration, washed with acetone and ether and dried in vacuo at 40° C. to give methiodide of cis-4-propyl-L-hygramide.

In the same manner, other alkyl halides can be reacted with cis-4-alkyl-L-hygramides to give quaternary ammonium salts. Representative compounds obtained in this manner include the ethiodide, propyl iodide, butyl iodide, pentyl iodide, hexyl iodide, octyl iodide, decyl iodide, dodecyl iodide, tetradecyl iodide, octadecyl iodide, eicosyl iodide, and the like, of cis-4-alkyl-L-hygramides.

Example 17.—Cis-4-ethyl-L-hygric acid (A) 4-KETO-1-TOSYL-L-PROLINE 4-hydroxy-1-tosyl-L-proline (22.5 g.), prepared by tosylation of 4-hydroxy-L-proline by the method of E. W. McChesney et al., J. Am. Chem. Soc., 59, 1116 (1937), was oxidized in 900 ml. of acetone with 90 ml. of Jones' reagent. (One liter of Jones' reagent contains 267 g. of chromic anhydride, 230 ml. of concentrated sulfuric acid, and the balance water.) Jones' reagent was added over a period of 5 minutes and the mixture was allowed to stand for 45 minutes at a temperature of 26° C. Thereafter 30 ml. of methanol was added, destroying the excess oxidant. The reaction mixture was filtered, diluted with 2.5 l. of methylene chloride, washed three times with 900 ml. of saturated sodium chloride, then evaporated to a small volume and again filtered. The filtrate was evaporated and the residue was crystallized twice from Skellysolve B and ether to give 12.9 g. of 4-keto-1-tosyl-L-proline melting at 145–161° C. with decomposition. This product was recrystallized three times from acetonitrile to give pure 4-keto-1-tosyl-L-proline melting at 178–208° C. with decomposition.

Analysis.—Calcd. for $C_{15}H_{35}N_3O_7$: C, 61.33; H, 7.21; N, 8.58. Found: C, 61.15; T, 7.22; N, 8.40.

(B) 4-ETHYLIDENE-1-TOSYL-L-PROLINE

Sodamide was prepared in the usual manner from 1.3 g. of sodium in 170 ml. of liquid ammonia and to it was added 22 g. of ethyltriphenylphosphonium bromide. The mixture was stirred for one hour, then evaporated to dryness. To the residue was added 75 ml. of ether and 75 ml. of tetrahydrofuran. The mixture was then heated for 8 minutes at reflux, cooled to room temperature (about 25° C.) and thereto was added 2.5 g. of 4-keto-1-tosyl-L-proline in 20 ml. of tetrahydrofuran. The mixture was heated under reflux for 3 hours, cooled and diluted with ether and potassium bicarbonate solution and filtered; the ether was discarded. The filtrate was acidified and extracted three times with ether. Evaporation of the ether gave crude 4-ethylidene-1-tosyl-L-proline.

(C) CIS-4-ETHYL-L-HYGRIC ACID

A suspension of 20 g. of 4-ethylidene-1-tosyl-L-proline in 300 ml. of 5% sodium hydroxide and 300 ml. of ether was shaken until all of the solid had dissolved. The layers were separated and each was backwashed with free solvent. The combined alkaline solutions were acidified with dilute acid and extracted with ether. Evaporation of the ether gave 4-ethylidene-1-tosyl-L-proline, which was dissolved in 250 ml. of methanol and hydrogenated over 2 g. of 10% palladium-on-carbon catalyst under 45 lbs. of hydrogen pressure for a period of 2½ hours. The hydrogenation was then interrupted and 6 ml. of formalin and 1 g. of 10% palladium-on-carbon catayst were added. Hydrogenation was continued for a period of another 2½ hours. The reaction mixture was filtered and the filtrate was evaporated to dryness. The residue, cis-4-ethyl-L-hygric acid, was repeatedly recrystallized from aqueous ethanol to give substantially pure cis-4-ethyl-L-hygric acid. To purify the cis-4-ethyl-L-hygric acid further, the product was converted to its amide as in Example 9, and the amide chromatographed using 80% aqueous acetone as eluant. The fractions containing practically pure cis-4-ethyl-L-hygramide were separated, evaporated, and the product heated with dilute hydrochloric acid (20%) for four hours at the boiling point. The reaction mixture was cooled, evaporated to dryness in vacuo, and the residue was slurried with a little warm ethanol and filtered to remove ammonium chloride. Ether was added to the filtrate, and after cooling a white solid separated, which was cis-4-ethyl-L-hygric acid hydrochloride.

To a solution of 4 g. of cis-4-ethyl-L-hygric acid hydrochloride in water was added silver carbonate in portions under continuous stirring. After foaming subsided, the mixture was heated on a steam bath for 30 minutes and placed in a refrigerator for 20 hours. Decolorizing carbon (0.5 g.) was added, the mixture was stirred again at room temperature for ½ hour and filtered. The filtrate was concentrated to dryness and the dry material redissolved in ethyl alcohol and again evaporated to dryness. The process was repeated until the dry residue became crystalline. Two recrystallizations from ethanol gave pure cis-4-ethyl-L-hygric acid.

Example 18.—Cis-4-butyl-L-hygric acid (A) 1-p-NITROCARBOBENZOXY-4-HYDROXYPROLINE
[Carpenter et al., J. Am. Chem. Soc. 74, 3818 (1952)]

Fifty millimoles (5.75 g.) of 4-hydroxy-L-proline was dissolved in 15.6 ml. (62 mmoles) of 4 N sodium hydroxide and the solution was cooled in an ice-water bath. A solution of 13.5 g. of p-nitrocarbobenzoxy chloride in 32 ml. of dioxane and 15.6 ml. of a 4 N sodium hydroxide solution were each added in approximately 5 equal portions over a period of 2 hours to the cooled 4-hydroxy-L-proline solution. The reaction mixture was vigorously stirred an additional hour and filtered. The filtrate was acidified with hydrochloric acid and extracted with methylene chloride. The methylene chloride solution was extracted three times with potassium bicarbonate solution. The combined potassium bicarbonate extracts were acidified with hydrochloric acid and extracted with methylene chloride. The methylene chloride extracts were combined and evaporated to give 10.5 g. (68.8%) of 1-p-nitrocarbobenzoxy-4-hydroxyproline which was recrystallized from ethyl acetate-Skellysolve B; yield, 5.65 g. of 1 - p - nitrocarbobenzoxy - 4-hydroxyproline, melting point 131–135° C., rotation $[\alpha]_D$ —40° (c. 1, sodium hydroxide). The dicyclohexylamine salt of 1-p-nitrocarbobenzoxy-4-hydroxyproline was prepared according to the procedure in Example 5. After recrystallization from ethyl acetate-Skellysolve B hexanes it melted at 176–180° C. and had the following analysis:

Analysis.—Calcd. for $C_{25}H_{37}N_3O_7$: C, 61.08; H, 7.59; N, 8.55. Found: C, 60.73; H, 7.49; N, 8.18.

(B) 1-p-NITROCARBOBENZOXY-4-KETO-L-PROLINE

To a stirred solution of 2.48 g. of 1-p-nitrocarbobenzoxy-4-hydroxyproline in 100 ml. of acetone was added 8 ml. of Jones' reagent (267 g. of chromic anhydride, 230 ml. of sulfuric acid, and water to a total of 1 liter of solution) over a period of 10 minutes. After stirring an additional 35 minutes, the excess oxidizing agent was destroyed with methanol and the mixture was filtered. The filtrate was diluted with 300 ml. of methylene chloride and washed repeatedly with saturated sodium chloride solution. Evaporation of the solvent afforded 4-keto-1-p-nitrocarbobenzoxy-L-proline as an oil, which was converted to the dicyclohexylamine salt. The latter, after recrystallization from ethanol, was obtained in crystalline form in 77% yield, melting point 220–225° C. Two recrystallizations from ethanol gave an analytical sample of 1-p-nitrocarbobenzoxy-4-keto-L-proline dicyclohexylamine salt, melting point 224–227° C.

Analysis.—Calcd. for $C_{25}H_{35}N_3O_7$: C, 61.33; H, 7.21; N, 8.58. Found: C, 61.15; H, 7.22; N, 8.40.

(C) 4-BUTYLIDENE-1-p-NITROCARBOBENZOXY-L-PROLINE

A suspension of 3.8 g. of sodium hydride in 75 ml. of dimethyl sulfoxide was heated at 75° C. until the reaction was complete. After cooling to 22° C., 32 g. of butyltriphenylphosphonium bromide was added. The resulting solution was stirred for 30 minutes to insure complete reaction. A solution of 5.5 g. of 4-keto-1-p-nitrocarbobenzoxy-L-proline in 16 ml. of dimethylsulfoxide was added over a period of 15 minutes. The resulting solution was stirred for 25 minutes at room temperature (about 25° C.) and then for 5 hours at 70° C. The reaction mixture was cooled, treated with 100 ml. of potassium bicarbonate solution and 100 ml. of water and filtered. The filtrate was washed with 250 ml. portions of ether and the ether was discarded after back-extracting with bicarbonate solution. The combined bicarbonate solutions were diluted with 200 ml. of water, acidified with dilute hydrochloric acid, and extracted with three 200-ml. portions of ether. The combined ether extracts were washed with three 50-ml. portions of saturated sodium bisulfite solution, then with water, dried over anhydrous sodium sulfate, and evaporated to give a residue of 4-butylidene-1-p-nitrocarbobenzoxy-L-proline.

(D) CIS-4-BUTYL-L-PROLINE

Five grams of 4-butylidene-1-p-nitrocarbobenzoxy-L-proline in 200 ml. of methanol was hydrogenated under 40 lbs. pressure in the presence of 1 g. of 10% palladium-on-carbon catalyst for a period of 2 hours. After this period, another 0.5 g. of catalyst was added and hydrogenation was continued for 2 hours.

(E) CIS-4-BUTYL-L-HYGRIC ACID HYDROCHLORIDE

To the hydrogenation mixture was then added 5 ml. of formalin and 0.5 g. of the catalyst. Hydrogenation was then continued for 2½ hours at 45 lbs. hydrogen pressure. The reaction mixture was filtered and the solvent was removed by distillation. The thus-obtained residue of crude cis-4-butyl-L-hygric acid was converted to the hydrochloride as in Example 7 and crystallized from methanol-ether to give cis-4-butyl-L-hygric acid hydrochloride.

(F) CIS-4-BUTYL-L-HYGRIC ACID

Cis-4-butyl-L-hygric acid hydrochloride was treated in ethanol:water solution with an excess of silver carbonate and the mixture was stirred for one hour. Activated charcoal was added and the mixture was filtered. The filtrate was evaporated to give cis-4-butyl-L-hygric acid.

If desired, cis-4-butyl-L-hygric acid can be purified by converting it to the amide, chromatographing the amide to eliminate traces of trans-4-butyl-L-hygramide and converting the thus-obtained pure amide of cis-4-butyl-L-hygric acid with dilute hydrochloric acid to cis-4-butyl-L-hygric acid hydrochloride from which the free amino acid is obtained with silver carbonate as shown above.

In the manner shown in Example 18, other cis-4-alkyl-L-hygric acids can be prepared by reacting 4-keto-1-hydrocarbyloxy-carbonyl-L-proline with other Wittig reagents, such as for example pentylidenetriphenylphosphorane, hexylidenetriphenylphosphorane, heptylidenetriphenylphosphorane, octylidenetriphenylphosphorane, decylidenetriphenylphosphorane, dodecylidenetriphenylphosphorane, and the like, followed by hydrogenation as shown in the above-identified example. Representative cis-4-alkyl-L-hygric acids thus obtained include the cis-4-pentyl-L-hygric acid, cis-4-hexyl-L-hygric acid, cis-4-heptyl-L-hygric acid, cis-4-octyl-L-hygric acid, cis-4-decyl-L-hygric acid, cis-4-dodecyl-L-hygric acid, and the like.

In the manner given in Example 9, the amides of the cis-4-alkyl-L-hygric acids can be made, such as the cis-4 - pentyl - L - hygramide, cis-4-hexyl-L-hygramide, cis-4-heptyl-L-hygramide, cis-4-octyl-L-hygramide, cis-4-decyl-L-hygramide, cis-4-dodecyl-L-hygramide, and the like.

In the manner given in Example 12, esters of cis-4-alkyl-L-hygric acids can be made by reacting methanol, ethanol, propanol, butanol, pentanol, hexanol, heptanol, octanol, and the like with a selected cis-4-alkyl-L-hygric acid in the presence of hydrogen chloride to obtain the corresponding alkyl cis-4-alkyl-L-hygrate hydrochloride, which can be converted with silver oxide or silver carbonate to the free ester, an alkyl cis-4-alkyl-L-hygrate. Representative esters thus obtained include methyl cis-4-ethyl-L-hygrate, methyl cis-4-butyl-L-hygrate, methyl cis-4-pentyl-L-hygrate, methyl cis-4-hexyl-L-hygrate, methyl cis-4-decyl-L-hygrate, ethyl cis-4-butyl-L-hygrate, ethyl cis-4-hexyl-L-hygrate, ethyl cis-4-octyl-L-hygrate, ethyl cis - 4 - dodecyl-L-hygrate, propyl cis-4-propyl-L-hygrate, octyl cis-4-propyl-L-hygrate, propyl cis-4-hexyl-L-hygrate, butyl cis-4-propyl-L-hygrate, butyl cis-4-butyl-L-hygrate, butyl cis-4-decyl-L-hygrate, and the like.

In the manner given in Examples 13 and 16, esters and amides of cis-4-alkylhygric acids can be converted with alkyl halides to quaternary alkyl halide salts of esters and amides of cis-4-alkyl-L-hygric acids. Representative compounds thus prepared include the ethiodide of cis-4-ethyl-L-hygramide, the methiodide of cis-4-butyl-L-hygramide, the dodecyl, tetradecyl, octadecyl and eicosyl iodides of cis-4-propyl-L-hygramide, cis-4-butyl-L-hygramide, cis-4-hexyl-L-hygramide, cis-4-octyl-L-hygramide, cis-4-decyl-L-hygramide and the like; the ethiodide of ethyl cis-4-ethyl-L-hygrate, the butyl iodide of ethyl cis-4-propyl-L-hygrate, the methiodide of methyl cis-4-ethyl-L-hygrate, the ethiodide of pentyl cis-4-propyl-L-hygrate, the decyl iodide of methyl cis-4-propyl-L-hygrate, the octadecyl iodide of ethyl cis-4-propyl-L-hygrate, the tetradecyl iodide of butyl cis-4-butyl-L-hygrate and the like.

*Example 19.—Cis-4-propyl-L-hygric acid and trans-4-propyl-L-hygric acid*

Five grams of 4-propylidene-1-carbobenzoxy-L-proline in 200 ml. of methanol was hydrogenated over 1 g. of a 7% platinum-on-Dowex 1 catalyst (40 lbs. $H_2$, for 3 hours). (Dowex 1 is a strongly basic anion exchange resin produced by copolymerization of substituted styrenes and divinyl benzene.) After three hours of hydrogenation, 5 ml. of formalin and 1 g. of 10% palladium-on-charcoal catalyst was added and the hydrogenation was continued for 2½ hours at 45 lbs. pressure. The catalysts were then removed by filtration and the solvent was removed by distillation. The residue was dissolved in methanol, converted to the hydrochloride as in Example 7, and several times recrystallized from methanol-ether to give a mixture of the hydrochlorides of cis-4-propyl-L-hygric acid and trans-4-propyl-L-hygric acid, the latter in about 30% yield.

In the manner shown in Example 9, this mixture was separated by converting the hygric acids into the amides and treating, as in Example 10, the mixture of amides to obtain pure cis-4-propyl-L-hygric acid and pure trans-4-propyl-L-hygric acid.

In the manner given in Example 19, other trans-4-alkyl-L-hygric acids can be produced, such as trans-4-methyl-L-hygric acid, trans-4-ethyl-L-hygric acid, trans-4-butyl-L-hygric acid, trans-4-pentyl-L-hygric acid, trans-4-heptyl-L-hygric acid, trans-4-octyl-L-hygric acid, trans-4-decyl-L-hygric acid, trans-4-dodecyl-L-hygric acid and the like.

In the process of isolating these trans-4-alkyl-L-hygric acids, the corresponding amides are produced such as trans-4-methyl - L - hygramide, trans-4-ethyl-L-hygramide, trans-4-butyl-L-hygramide, trans-4-hexyl - L - hygramide, trans-4-octyl - L - hygramide, trans-4-decyl-L-hygramide, trans-4-dodecyl-L-hygramide and the like.

Reacting the trans-4-alkyl-L-hygramides with alkyl halides produces the alkyl halide quaternary ammonium salts of the trans-4-alkyl-L-hygramides. Representative compounds thus obtained include the methiodide, ethiodide, propyl iodide, butyl iodide, hexyl iodide, octyl iodide, decyl iodide, dodecyl iodide, tetradecyl iodide, octyldecyl iodide, eicosyl iodide and the like of trans-4-methyl-L-hygramide, trans-4-ethyl-L-hygramide, trans-4-butyl-L-hygramide, trans-4-hexyl-L-hygramide, trans-4-octyl-L-hygramide, trans-4-decyl-L-hygramide, trans-4-dodecyl-L-hygramide and the like.

In the manner shown in Example 12, trans-4-alkyl-L-hygric acids can be esterified by treating them in alcoholic solution, such as methanol, ethanol, propanol, butanol, t-butyl alcohol, hexanol, octanol, and the like, with gaseous hydrogen chloride. Representative esters thus obtained include propyl trans - 4 - methyl - L - hygrate, hexyl trans-4-propyl-L-hygrate, octyl trans-4-propyl-L-hygrate, ethyl trans-4-pentyl-L-hygrate, ethyl trans-4-hexyl-L-hygrate, and the like.

In the manner given in Example 13, the alkyl halide quaternary ammonium salts of these esters can be made by reacting an alkyl halide with an alkyl trans-4-alkyl-L-hygrate. Representative alkyl halide quaternary ammonium salts thus obtained include the methiodide, ethiodide, propyl iodide, butyl iodide, pentyl iodide, hexyl iodide, octyl iodide, decyl iodide, dodecyl iodide, tetradecyl iodide, octadecyl iodide and eicosyl iodide of methyl, ethyl, propyl, butyl, hexyl and octyl trans-4-methyl-, ethyl-, butyl-, pentyl-, hexyl-, octyl-, decyl-, dodecyl-, tetradecyl-, octadecyl- and eicosyl-L-hygrates.

In the manner shown for the synthesis of quaternary ammonium iodides, quaternary ammonium bromides can be made from cis-4-alkyl-L-hygric acid esters and amides and trans-4-alkyl-L-hygric acid esters and amides by reacting them with alkyl bromides instead of alkyl iodides.

If other quaternary ammonium salts of these hygric acid amides and esters are desired, the quaternary ammonium iodides or bromides are treated in aqueous alcoholic solution with an excess of silver oxide or silver carbonate to produce the corresponding quaternary ammonium hydroxides, which are then treated with the desired mineral acid, such as nitric, phosphoric, and the like to give the desired quaternary ammonium salt of the alkylhygric acid amide or ester.

In the manner shown in Examples 7a–7h, the nitrogen of the 4-alkyl-substituted proline can be substituted by an alkyl group other than methyl. Thus, by treating reaction mixtures containing 4-alkylprolines with an aldehyde or ketone of the formula

as earlier defined, and hydrogenating in the presence of a palladium-on-charcoal catalyst the corresponding 1,4-dialkyl-prolines are obtained. Representative compounds thus obtained include, e.g.: 1-ethyl-cis-4-butyl-L-proline, 1-propyl-cis-4-butyl-L-proline, 1-propyl-cis-4-pentyl-L-proline, 1-butyl-cis-4-hexyl-L-proline, 1-pentyl-cis-4-heptyl-L-proline, 1-(1-butyl-pentyl)-cis-4-decyl-L-proline, 1-(1-pentylheptyl)-cis-4-dodecyl-L-proline, and the like and also the trans isomers thereof.

In the same manner as given in Examples 13 and 16, the ester and amides of the L-prolines listed above can be prepared.

The methods of this invention are furthermore applicable for the preparation of the 1,4-dialkyl-D-prolines using as starting material 4-keto-D-proline and protecting the proline nitrogen by a protective hydrocarbyloxycarbonyl group as shown for the L-prolines in Formula I.

I claim:

1. A composition of matter selected from the group consistitng of compounds of the formula

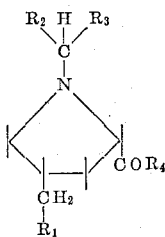

wherein $R_1$ is selected from the group consisting of hydrogen and alkyl, in which the alkyl group has from 1 to 11 carbon atoms, inclusive; wherein $R_2$ and $R_3$ are selected from the group consisting of hydrogen and alkyl in which the alkyl groups together contain up to and including 12 carbon atoms; and wherein $R_4$ is selected from the group consisting of hydroxy, alkyloxy in which the alkyl group has from 1 to 8 carbon atoms, inclusive, and amino; and mineral acid salts thereof.

2. Cis-4-methyl-L-hygric acid.
3. Methyl cis-4-propyl-L-hygrate.
4. Cis-4-propyl-L-hygramide.
5. Trans-4-methyl-L-hygric acid.
6. Trans-4-methyl-L-hygramide.
7. Methyl trans-4-methyl-L-hygrate.
8. A 4-alkylideneproline of the formula

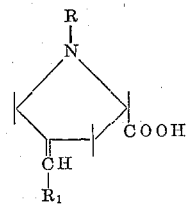

wherein R is a protective hydrocarbyloxycarbonyl group which is removable by hydrogenolysis, and wherein $R_1$ is selected from the group consisting of hydrogen and alkyl, in which the alkyl group contains from 1 to 11 carbon atoms, inclusive.

9. 4-propylidene-1-carbobenzoxy-L-proline.
10. A 4-alkylproline of the formula

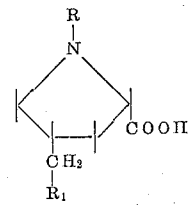

wherein R is a protective hydrocarbyloxycarbonyl group which is removable by hydrogenolysis, and wherein $R_1$ is selected from the group consisting of hydrogen and alkyl, in which the alkyl group contains from 1 to 11 carbon atoms, inclusive.

11. 4-propyl-1-carbobenzoxy-L-proline.
12. A quaternary ammonium salt of the formula

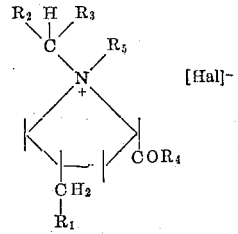

wherein $R_1$ is selected from the group consisting of hydrogen and alkyl, in which the alkyl group contains from 1 to 11 carbon atoms, inclusive; wherein $R_2$ and $R_3$ are selected from the group consisting of hydrogen and alkyl, in which the alkyl groups together contain up to and including 12 carbon atoms; wherein $R_4$ is selected from the group consisting of alkoxy radicals, in which the alkyl group has from 1 to 8 carbon atoms, inclusive, and amino; wherein $R_5$ is an alkyl group containing from 1 to 20 carbon atoms, inclusive; and wherein Hal is selected from the group consisting of iodine and bromine.

13. Methiodide of cis-4-propyl-L-hygramide.
14. Methiodide of methyl cis-4-propyl-L-hygrate.
15. A process for the production of a 1-alkyl-cis-4-alkyl-L-proline of the formula

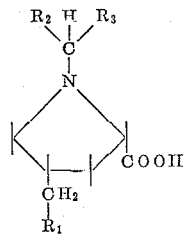

wherein $R_1$ is selected from the group consisting of hydrogen and alkyl in which the alkyl group contains from 1 to 11 carbon atoms, inclusive, and wherein $R_2$ and $R_3$ are selected from the group consisting of hydrogen and alkyl in which the alkyl groups together contain up to and including 12 carbon atoms, which comprises: treating a 4-keto-L-proline of the formula

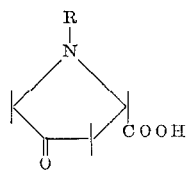

wherein R is a protective hydrocarbyloxycarbonyl group which is removable by hydrogenolysis, with an alkylidenetriphenylphosphorane to obtain a 4-alkylidene-L-proline of the formula

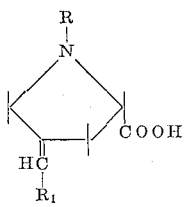

wherein R and $R_1$ are defined as above; hydrogenating the thus-obtained 4-alkylidene-L-proline in the presence of a palladium catalyst to obtain a proline of the formula

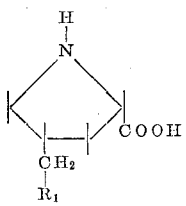

wherein $R_1$ is defined as above and continuing hydrogenation in the presence of a carbonyl compound of the formula

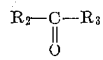

wherein $R_2$ and $R_3$ are defined as above, to obtain the desired 1-alkyl-cis-4-alkyl-L-proline.

16. The process of claim 15, wherein the alkylidenetriphenylphosphorane is methylenetriphenylphosphorane,

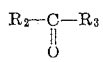

is formalin, and the product is cis-4-methyl-L-hygric acid.

17. The process of claim 15, wherein the alkylidenetriphenylphosphorane is propylidenetriphenylphosphorane

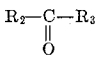

is formalin, and the product is cis-4-propyl-L-hygric acid.

18. A process for the production of a mixture of 1-alkyl-cis-and trans-4-alkyl-L-prolines of the formulae

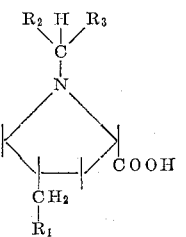

and

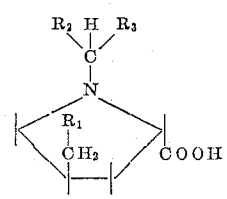

wherein $R_1$ is selected from the group consisting of hydrogen and alkyl in which the alkyl group contains from 1 to 11 carbon atoms, inclusive, wherein $R_2$ and $R_3$ are selected from the group consisting of hydrogen and alkyl in which the alkyl groups together contain up to and including 12 carbon atoms, which comprises: treating a 4-keto-L-proline of the formula

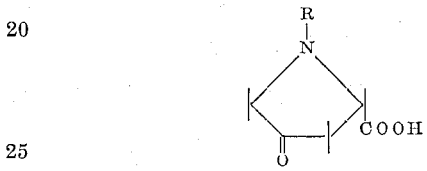

wherein R is a protective hydrocarbyloxycarbonyl group which is removable by hydrogenolysis, with an alkylidenetriphenyl-phosporane to obtain a 4-alkylidene-L-proline of the formula

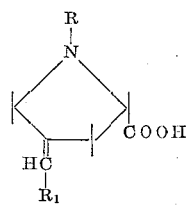

wherein R and $R_1$ are defined as above; hydrogenating the thus-obtained 4-alkylidene-L-proline in the presence of a platinum catalyst on an anion exchange resin as carrier to obtain a mixture of prolines of the formulae

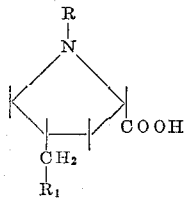

and

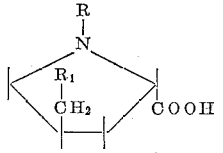

wherein R and $R_1$ are defined as above, and continuing hydrogenation in the presence of a carbonyl compound

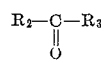

wherein $R_2$ and $R_3$ are defined as above, and palladium-on-charcoal catalyst to obtain a mixture of the corresponding 1-alkyl-cis-4-alkyl-L-proline and 1-alkyl-trans-4-alkyl-L-proline.

19. A process for the production of cis- and trans-4-alkyl-L-hygric acids of the formulae

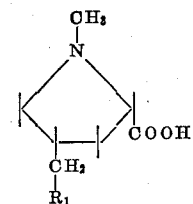

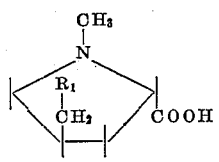

wherein $R_1$ is selected from the group consisting of hydrogen and alkyl in which the alkyl group contains from 1 to 11 carbon atoms, inclusive, which comprises: treating a 4-keto-L-proline of the formula

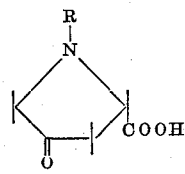

wherein R is a protective hydrocarbyloxycarbonyl group which is removable by hydrogenolysis, with an alkylidenetriphenylphosphorane to obtain a 4-alkylidene-L-proline of the formula

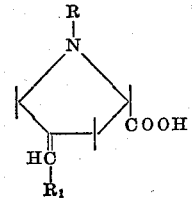

wherein R and $R_1$ are defined as above; hydrogenating the thus-obtained 4-alkylidene-L-proline in the presence of a platinum catalyst on an anion exchange resin as carrier to obtain a mixture of prolines of the formula

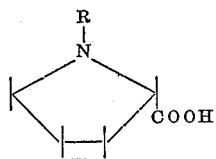

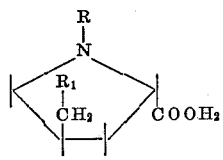

wherein R and $R_1$ are defined as above, and continuing the hydrogenation in the presence of formalin and a palladium catalyst to obtain a mixture of cis-4-alkyl-L-hygric acid and trans-4-alkyl-L-hygric acid; treating the mixture with a tri-lower-alkyl amine and a choloroformic ester and thereupon with ammonium hydroxide to obtain a mixture of cis- and trans-4-alkyl-L-hygramides; separating chromatographically the amide mixture to obtain the pure cis- and pure trans-4-alkyl-L-hygramides; hydrolyzing separately each of the amides with a mineral acid to obtain the mineral acid salts of the cis-4-alkyl-L-hygric acid and the trans-4-alkyl hygric acid; and treating the mineral acid salts with a base to obtain the pure cis-4-alkyl-L-hygric acid and the pure trans-4-alkyl-L-hygric acid.

References Cited by the Examiner
UNITED STATES PATENTS
3,086,912  4/1963  Bergy et al. _____ 167—65

LEWIS GOTTS, *Primary Examiner.*

J. R. BROWN, *Assistant Examiner.*